(12) United States Patent
Demerath (10) Patent No.: US 11,752,840 B2
(45) Date of Patent: Sep. 12, 2023

(54) AIR VENT FOR A VEHICLE WITH EXTERNAL ACTUATING ELEMENT

(71) Applicant: ILLINOIS TOOL WORKS INC., Glenview, IL (US)

(72) Inventor: Michael Demerath, Hüffler (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 304 days.

(21) Appl. No.: 16/978,384

(22) PCT Filed: Mar. 8, 2019

(86) PCT No.: PCT/US2019/021377
§ 371 (c)(1),
(2) Date: Sep. 4, 2020

(87) PCT Pub. No.: WO2019/177893
PCT Pub. Date: Sep. 19, 2019

(65) Prior Publication Data
US 2021/0039477 A1 Feb. 11, 2021

(30) Foreign Application Priority Data
Mar. 13, 2018 (DE) ..................... 10 2018 105 714.8

(51) Int. Cl.
*B60H 1/34* (2006.01)

(52) U.S. Cl.
CPC ......... *B60H 1/3421* (2013.01); *B60H 1/3428* (2013.01); *B60H 2001/3471* (2013.01)

(58) Field of Classification Search
CPC ................ B60H 1/3421; B60H 1/3428; B60H 2001/3471
See application file for complete search history.

(56) References Cited

U.S. PATENT DOCUMENTS

2002/0081965 A1   6/2002   Demerath

FOREIGN PATENT DOCUMENTS

| DE | 10309754 A1 | 9/2004 | |
| DE | 102007059190 A1 * | 3/2009 | ........... B60H 1/3421 |
| EP | 0551883 A1 * | 7/1993 | |

(Continued)

OTHER PUBLICATIONS

Pct, International Search Report and Written Opinion, International Application No. PCT/US2019/021377; dated Jul. 1, 2019, 11 pages.

*Primary Examiner* — Steven S Anderson, II
(74) *Attorney, Agent, or Firm* — THOMPSON HINE LLP (57) ABSTRACT

Air vent for a vehicle, including an air duct, which is bounded by a housing (12'), with an air inlet end and an air outlet end, wherein an air flow flowing through the air duct can flow from the air inlet end to the air outlet end along a main flow direction and a manual actuating element (22) for controlling the air outlet direction of the air flow by movement of fins (60, 62), wherein, during a translational movement of the manual actuating element along a movement axis the air outlet direction undergoes a change along the movement axis, and wherein, during a tilting movement of the manual actuating element about the movement axis, the air outlet direction undergoes a change perpendicular to the movement axis, wherein the manual actuating element is arranged outside the air flow.

9 Claims, 6 Drawing Sheets

(56) References Cited

FOREIGN PATENT DOCUMENTS

| | | | |
|---|---|---|---|
| EP | 1375217 B1 | 6/2006 | |
| EP | 1207062 B1 | 8/2010 | |
| FR | 2861652 A1 | 5/2005 | |
| FR | 3054491 A1 | 2/2018 | |
| WO | WO-2016188993 A1 * | 12/2016 | ........... B60H 1/3421 |

* cited by examiner

AIR VENT FOR A VEHICLE WITH EXTERNAL ACTUATING ELEMENT

TECHNICAL FIELD

The invention relates to an air vent for a vehicle, comprising an air duct, which is bounded by a housing, with an air inlet end and an air outlet end, wherein an airflow flowing through the air duct can flow from the air inlet end to the air outlet end along a main flow direction, and a manual actuating element for controlling the air outlet direction of the airflow.

BACKGROUND

Air vents serve for ventilating a vehicle interior and can be arranged, for example, in the dashboard of the vehicle in such a manner that the airflow emerging from the air outlet end of the air duct passes into the vehicle interior. In order to deflect the airflow from the main flow direction, air vents customarily have air-guiding elements which can be configured, for example, as slats or air-guiding gratings. An orientation of the air-guiding elements and therefore control of the air outlet direction of the airflow can take place via the manual actuating element. EP 1 207 062 B1 describes an air vent with slats and an actuating element which is arranged centrally at the air outlet end of the air duct, wherein the actuating element can be displaced along a horizontal axis and pivoted along a vertical axis in order to adjust the slats. Although such a movement is intuitive for an operator, the actuating element and the adjustment mechanism associated therewith impair the airflow. In particular, an undesirable deflection or splitting of the airflow may occur. EP 1 375 217 B1 discloses an air vent with an actuating element which is designed as a hemisphere and can be pivoted about two axes perpendicular to each other. However, firstly, the design of said air vent is very bulky and, secondly, the operation is less intuitive.

SUMMARY

The invention is based on the object of providing an air vent which, while having a compact design and intuitive operation, has as little negative effect as possible on the airflow.

The invention achieves the object by the subject matter of claim 1. Advantageous refinements are the subject matter of the dependent claims, the description and the figures.

The air vent according to the invention for a vehicle comprises an air duct, which is bounded by a housing, with an air inlet end and an air outlet end, wherein an airflow flowing through the air duct can flow from the air inlet end to the air outlet end along a main flow direction and a manual actuating element for controlling the air outlet direction of the airflow, wherein, during a translational movement of the manual actuating element along a movement axis, the air outlet direction undergoes a change along said movement axis, and wherein, during a tilting movement of the manual actuating element about the movement axis, the air outlet direction undergoes a change perpendicular to the movement axis, wherein the manual actuating element is arranged outside the airflow.

During operation, an airflow flows through the air vent from the air inlet end to the air outlet end and, in the process, flows substantially along the main flow direction, in particular parallel to a longitudinal axis of the housing. Via the manual actuating element, an operator located in the vehicle interior can influence the airflow and can thus control the air outlet direction of the airflow. For this purpose, the manual actuating element can interact in particular with air-guiding elements arranged in the air duct, as will also be explained later on. According to the invention, the manual actuating element is designed to be tiltable about a movement axis and displaceable along the movement axis, wherein, by means of these movements, the airflow can be oriented in two directions perpendicular to each other. The air outlet direction can therefore be adjusted in a plane substantially perpendicular to the main flow direction. In an installed state of the air vent, the movement axis can extend in particular horizontally. By means of a movement of the manual actuating element in a translational manner on the movement axis, for example to the right and left in the case of a horizontal movement axis, an operator can consequently adjust the airflow along said axis. In a corresponding manner, by means of a movement of the manual actuating element on an axis perpendicular to the movement axis, for example upward and downward in the case of a horizontal movement axis, an operator can likewise deflect the airflow on said perpendicular axis. In particular, it can be provided that an orientation of the airflow takes place in the same direction in which the manual actuating element is adjusted, as also explained later on. The manual actuating element can be designed, for example, as an elongate actuating element running on the movement axis. The explained movement of the manual actuating element and the associated adjustment of the air outlet direction are particularly intuitive.

Furthermore, it is provided according to the invention to arrange the manual actuating element outside the airflow. The manual actuating element is consequently not arranged in the airflow directly at the air outlet end, but rather, for example, directly next to the air outlet end. For example, the manual actuating element can be arranged in a front of the housing, in particular in a front panel of the housing. However, it is also conceivable to arrange the manual actuating element separately, even at a relatively large distance, from the housing. The explained movement of the manual actuating element along or about the movement axis is preferably converted mechanically into a change in the air outlet direction, as will be explained later on. However, an electrical conversion of the movement is also conceivable. The arrangement according to the invention of the manual actuating element outside the airflow leads to a lower flow resistance and therefore to a higher air throughput. In addition, annoying flow noises can be avoided. In particular, the manual actuating element does not lead to an undesirable deflection or splitting of the airflow. An adjustment mechanism provided for converting the movement of the manual actuating element into a change in the air outlet direction can preferably also be arranged outside the airflow, in particular outside the housing. By means of the arrangement of the manual actuating element outside the airflow, with the explained movement possibilities being realized at the same time, simple and intuitive operation of the air vent can take place with a simultaneously more efficient airflow.

According to one refinement, during a translational movement of the manual actuating element along the movement axis in a first direction, the emerging airflow undergoes a change in the first direction, and, during a translational movement of the manual actuating element along the movement axis in a second direction opposed to the first direction, the emerging airflow undergoes a change in the second direction. According to a further refinement, during a tilting movement of the manual actuating element in a first direction, the emerging airflow undergoes a change in the first direction perpendicular to the movement axis, and, during a tilting movement of the manual actuating element in a second direction opposed to the first direction, the emerging airflow undergoes a change in the second direction perpendicular to the movement axis. Therefore, it is thus possible to provide that, during the translational movement and/or during the tilting movement of the manual actuating element, the air outlet direction changes into the direction in which the manual actuating element is moved. For example, if the manual actuating element is moved to the left, the airflow is deflected to the left. The same applies to a movement of the manual actuating element to the right, upward or downward. During the tilting movement of the manual actuating element, that portion of the manual actuating element which is made contact with by an operator is moved in the first or second direction perpendicular to the movement axis, as a result of which the manual actuating element is tilted about the movement axis. The change of the air outlet direction in the direction of the movement of the manual actuating element is particularly intuitive.

According to one refinement, the air vent comprises at least one air-guiding element on which the manual actuating element acts in order to control the air outlet direction. In particular, a conversion of the translational movement and/or of the tilting movement of the manual actuating element to a movement of the at least one air-guiding element can be provided. The at least one air-guiding element here can convert both the translational movement and the tilting movement of the manual actuating element. Provision may also be made for separate air-guiding elements to be provided for converting the translational movement and for converting the tilting movement. The airflow flowing through the air duct along the main flow direction can therefore be oriented by adjustment of the at least one air-guiding element.

According to one refinement, a movement of the manual actuating element is transferred to the at least one air-guiding element by an operating shaft which is arranged outside the airflow and extends parallel to the movement axis, wherein a movement of the manual actuating element in one direction results in a movement of the operating shaft in the same direction. In this case, in particular both the translational movement and the tilting movement of the manual actuating element can be transferred to the operating shaft and via the latter to the at least one air-guiding element. From the translational movement of the manual actuating element, a corresponding translational movement of the operating shaft thus follows, and from a tilting movement of the manual actuating element, a corresponding tilting movement of the operating shaft thus follows, in the same direction in each case. For this purpose, the manual actuating element can engage in particular directly in the operating shaft, i.e. in particular can be connected directly mechanically thereto. The movement axis of the manual actuating element can then in particular coincide with a longitudinal axis of the operating shaft. The operating shaft finally converts the movement of the manual actuating element in interaction with optionally further components into a movement of the at least one air-guiding element. By means of an arrangement of the operating shaft also outside the airflow, in particular outside the housing, said operating shaft also does not interfere with the airflow. In particular, a lower flow resistance results.

According to a further refinement, the air vent comprises a rotary shaft which is connected to the at least one air-guiding element and runs perpendicularly to the operating shaft, wherein the rotary shaft has a gearwheel which is in engagement with a toothing of the operating shaft in such a manner that, during a translational movement of the operating shaft along its longitudinal axis, the rotary shaft is rotated about its axis of rotation. The rotary shaft converts the translational movement of the operating shaft and therefore of the manual actuating element into a rotational movement of the rotary shaft. By engagement of the toothing of the operating shaft with the gearwheel of the rotary shaft, the rotary shaft can be rotated in two opposed directions of rotation. During a translational movement of the manual actuating element and therefore of the operating shaft in a first direction along the axis of movement, rotation of the rotary shaft in a first direction of rotation therefore takes place, while, during a translational movement of the manual actuating element and therefore of the operating shaft in a second direction opposed to the first direction, rotation of the rotary shaft in a second direction of rotation takes place. The teeth of the toothing of the operating shaft extend here in particular perpendicularly to the longitudinal axis of the rotary shaft or at least over a partial circle about the longitudinal axis of the operating shaft. During a tilting movement of the operating shaft, the teeth of the gearwheel can therefore slide along in the toothing of the operating shaft, and therefore solely moving the operating shaft along its longitudinal axis results in rotation of the rotary shaft. As already explained above, the longitudinal axis of the operating shaft can lie in particular on the movement axis. The rotary shaft in turn acts on one or more air-guiding elements. A transfer of the translational movement of the operating shaft and consequently of the manual actuating element to the at least one air-guiding element can take place via the explained adjustment mechanism. Such a transfer is particularly efficient and permits a linear force transmission from the manual actuating element to the at least one air-guiding element. An adjustment of the air outlet direction therefore takes place to the extent to which the manual actuating element has been moved, which in turn is particularly intuitive. The rotary shaft is preferably arranged at least in sections outside the airflow, in particular outside the housing. The rotary shaft therefore only disturbs the flow to a small extent.

According to one refinement, the gearwheel of the rotary shaft is arranged outside the airflow. In particular, the gearwheel can be arranged outside the housing. The rotary shaft can therefore be arranged in sections outside the airflow, which leads to a smaller disturbance of the airflow.

According to a further refinement, as air-guiding elements, a plurality of air-guiding gratings which extend substantially perpendicularly to the main flow direction and are coupled to one another in terms of movement are arranged in the air duct, wherein the rotary shaft is connected via at least one push rod to a driven air-guiding grating in such a manner that, by means of a rotational movement of the rotary shaft, the driven air-guiding grating is adjusted in a translatory manner counter to the direction of movement of the operating shaft. The air-guiding gratings here form in particular a common grating pack having a plurality of air-conducting ducts formed by superimposition of the grating openings of adjacent air-guiding gratings. The air-guiding gratings are movable relative to one another, as a result of which the orientation of the air-conducting ducts can be changed. The air-guiding gratings are preferably arranged at the air outlet end of the housing, for example in a front panel connected to the housing. The manual actuating element acts on the driven air-guiding grating via the operating shaft, the rotary shaft connected thereto and the push rod connected to the rotary shaft. The rotary shaft can be connected via the at least one push rod in particular to an air-guiding grating located furthest on the inside in such a manner that, by means of a rotational movement of the rotary shaft, the air-guiding grating located furthest on the inside is adjusted in a translatory manner counter to the direction of movement of the operating shaft. The driven air-guiding grating can consequently be the air-guiding grating located furthest on the inside. Furthest on the inside refers here to the air-guiding grating which is located furthest in the air duct, i.e. is at a greatest distance from the air outlet end. During a translational movement of the manual actuating element and therefore of the operating shaft along the movement axis, a rotational movement of the rotary shaft takes place—as explained above—and, in turn, obtains a movement of the at least one push rod. The at least one push rod can be connected here to the rotary shaft in particular via a ball and socket joint, wherein the ball and socket joint is preferably arranged offset with respect to an axis of rotation of the rotary shaft. The effect is therefore achieved that, by rotation of the rotary shaft about its axis of rotation, the ball and socket joint is moved about the axis of rotation. This in turn has the consequence that the push rod is displaced in particular along an axis parallel to the movement axis. Depending on the direction of rotation of the rotary shaft, the push rod pushes the driven air-guiding grating along the movement axis in one direction or pulls same along the movement axis in the opposed direction. The effect is therefore achieved that the driven air-guiding grating is adjusted in a translatory manner counter to the direction of movement of the operating shaft. This is necessary in order to achieve a change of the air outlet direction into the direction in which the manual actuating element has been adjusted. For this purpose, namely by adjustment of the driven air-guiding element, the air-guiding gratings which are coupled in terms of movement to said air-guiding element—for example via a handle reaching through all of the air-guiding gratings—are moved. By this means, the change of the orientation of the air-conducting ducts finally takes place. In this case, one of the air-guiding gratings, in particular the air-guiding grating located furthest on the outside, is stationary in relation to the housing. A connection of the push rod to the driven air-guiding grating can also take place in particular via a ball and socket joint. By means of the explained mechanism, during the translational movement of the manual actuating element along the movement axis, the intuitive adjustment of the airflow for air-guiding gratings as air-guiding elements is achieved, in particular the adjustment of the airflow into the direction in which the manual actuating element is also moved. The rotary shaft can be mounted on the housing on one side or on both sides.

According to one refinement, the rotary shaft is connected via at least two push rods, which are arranged offset along the axis of rotation of said rotary shaft, to the driven air-guiding grating. A transfer of the rotational movement of the rotary shaft about its axis of rotation to the driven air-guiding grating can therefore take place via two or more push rods. By means of the offset of the push rods along the axis of rotation, it can be ensured that the driven air-guiding grating completes the desired movement along the movement axis and is not rotated or tilted in relation thereto.

According to a further refinement, the operating shaft is connected via at least one push rod to the driven air-guiding grating in such a manner that, during a tilting movement of the operating shaft about the movement axis, the driven air-guiding grating is adjusted in a translatory manner perpendicular to the operating shaft. By means of a tilting movement of the manual actuating element about the movement axis, the operating shaft is correspondingly tilted about its longitudinal axis, as explained above. The operating shaft is connected to the at least one push rod in particular via a ball and socket joint. The ball and socket joint here is preferably arranged offset with respect to the longitudinal axis of the operating shaft, and therefore, during a rotation of the operating shaft about its longitudinal axis, said ball and socket joint rotates about the longitudinal axis. By this means, the push rod which is connected to the operating shaft is adjusted in a translatory manner substantially along an axis perpendicular to the longitudinal axis of the operating shaft and to the movement axis. The at least one push rod is connected to the driven air-guiding grating in particular via a further ball and socket joint, and therefore the translational movement of the push rod leads to a translational movement of the driven air-guiding grating in the same direction. A conversion of the tilting movement of the manual actuating element and therefore of the operating shaft into a translational movement of the driven air-guiding grating therefore takes place. The movement of the air-guiding grating takes place perpendicularly to the movement axis. On account of the coupling of the air-guiding gratings—for example by a further handle—the air-conducting ducts are adjusted analogously to the manner already described above, with the air outlet direction here undergoing a change perpendicular to the movement axis. Together with the above-explained conversion of the translational movement of the operating shaft and therefore of the manual actuating element into a movement along the movement axis, the adjustment perpendicularly to the movement axis can also be achieved by means of this refinement, and therefore the air outlet direction can be adjusted in a plane which is in particular perpendicular to the main flow direction.

According to one refinement, the operating shaft is connected via at least two push rods, which are arranged offset along the longitudinal axis of said operating shaft, to the driven air-guiding grating. By this means, it can be achieved, analogously to the abovementioned manner, that the driven air-guiding grating is not undesirably rotated or tilted, but rather is merely adjusted in the plane perpendicular to the main flow direction.

According to a further refinement, as air-guiding elements, a plurality of slats which extend parallel to the rotary shaft, are pivotable in relation to the main flow direction and are coupled in terms of movement to each other are arranged in the air duct, wherein the rotary shaft is connected to one of the slats in such a manner that a rotational movement of the rotary shaft is converted into a corresponding rotational movement of the slats. The rotary shaft can share a common axis of rotation in particular with one of the slats. The slats extend perpendicularly to the operating shaft. By means of a translational movement of the manual actuating element and therefore of the operating shaft, as explained above, rotation of the rotary shaft, and therefore, in this case, rotation of the slat, which is coupled to the rotary shaft, in the same direction takes place. On account of the coupling of the slats to one another, the movement of the driven slat is transmitted to the further slats, and therefore, by means of the translational movement of the manual actuating element, deflection of the airflow in the direction of movement takes place. By means of these slats, the translational movement is therefore converted into an identically directed change of the air outlet direction.

According to a further refinement, further slats which extend parallel to the operating shaft, are pivotable in relation to the main flow direction and are coupled in terms of movement to each other are arranged as air-guiding elements in the air duct, wherein the operating shaft is coupled to at least one of said slats via at least one coupling rod in such a manner that, during a tilting movement of the operating shaft about its longitudinal axis, the slats are correspondingly pivoted in the direction of rotation of the operating shaft. According to this refinement, in addition to the slats which have just been explained and extend parallel to the rotary shaft, slats which extend parallel to the operating shaft and therefore perpendicularly to the rotary shaft are also provided. Said further slats can be arranged in particular further downstream in the air duct, i.e. closer to the air outlet end than the slats extending parallel to the rotary shaft. The slats extending parallel to the operating shaft convert a tilting movement of the manual actuating element about the movement axis via a corresponding movement of the operating shaft into a change of the air outlet direction perpendicular to the movement axis. The tilting or rotational movement of the operating shaft is transferred via the coupling rod into pivoting of the slat connected to said coupling rod and via said slat in turn to the further slats, for example by means of a coupling clip. The operating shaft can have in particular a coupling lever which extends away from the operating shaft and, during a rotation of the operating shaft about its longitudinal axis, rotates about the latter. The movement can thereby be efficiently converted. This conversion is mechanically simple and in particular also leads to a linear force transmission from the manual actuating element to the slats. In particular, a slat lying closest to the operating shaft can be coupled to the operating shaft via the coupling rod, and therefore the airflow is as far as possible only slightly impaired by the coupling rod. A conversion of the tilting movement into an identically directed change of the air outlet direction, i.e. perpendicularly to the movement axis, therefore takes place by means of said slats.

According to one refinement, the operating shaft is coupled to the coupling rod via an interlocking connection, in particular a tongue and groove connection, in such a manner that a translatory movement of the operating shaft along its longitudinal axis is not transferred to the coupling rod. For example, the operating shaft can have a groove which extends along its longitudinal axis and in which a spring of the coupling rod or of a coupling lever connected to the coupling rod runs during a translational movement of the operating shaft along the longitudinal axis. The coupling rod or a coupling lever connected to the coupling rod can also have a groove in which a spring extending along the longitudinal axis of the operating shaft runs during the movement of the operating shaft along the longitudinal axis. By this means, coupling of the coupling rod to the operating shaft takes place only with regard to the rotational movement of the operating shaft, but not with respect to the translational movement.

The invention furthermore relates to a vehicle with an air vent, configured as explained above.

BRIEF DESCRIPTION OF THE DRAWINGS

Two exemplary embodiments of the invention will be explained below with reference to figures, in which.

Unless stated otherwise, the same reference signs denote the same objects in the following.

DETAILED DESCRIPTION

Figure 1:
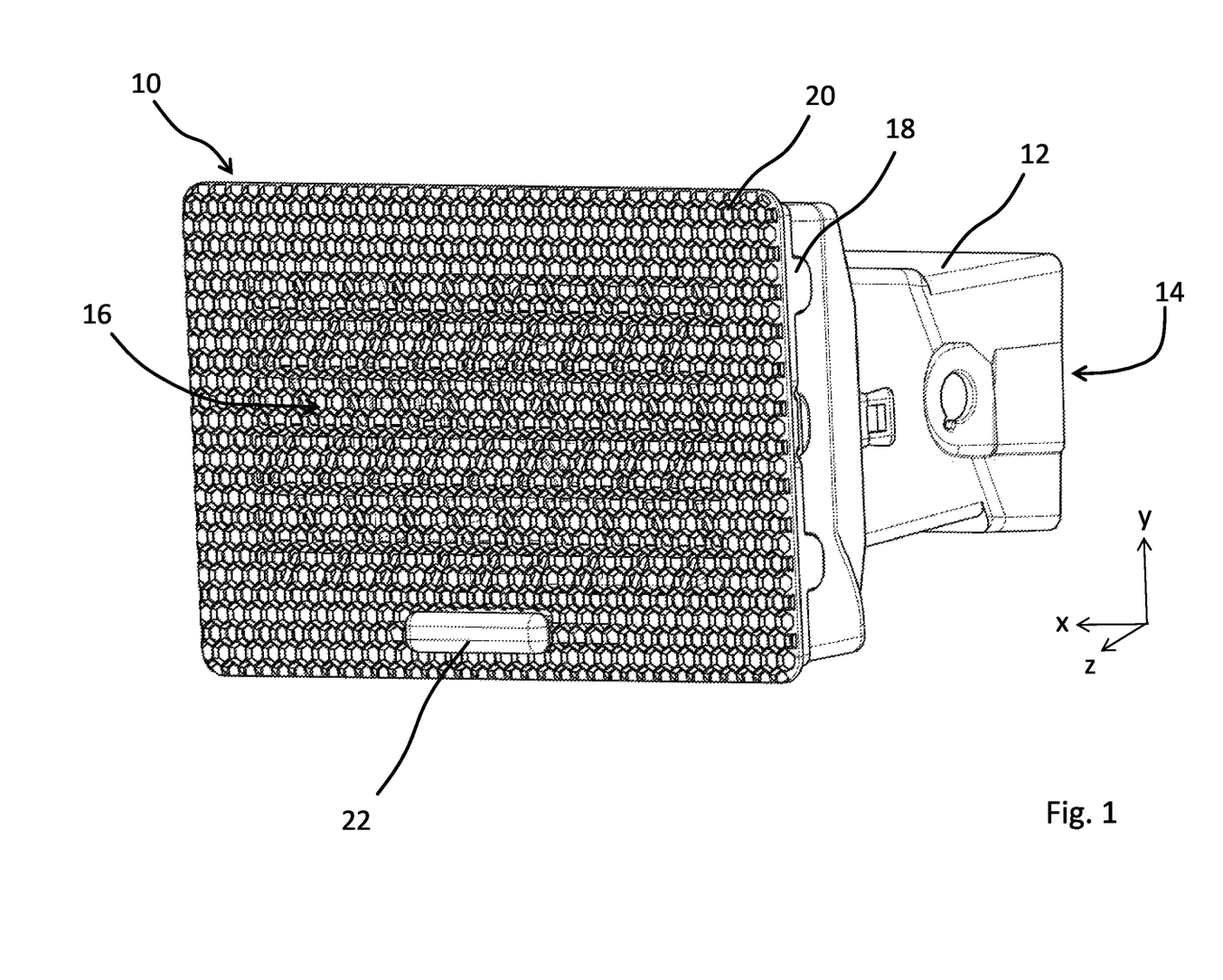
FIG. 1 shows an air vent in a first refinement with air-guiding gratings as air-guiding elements.

FIG. 1 shows the air vent according to the invention in a first refinement. The air vent 10 comprises a housing 12 which bounds an air duct which extends from an air inlet end 14 to an air outlet end 16 of the housing 12. At the air outlet end 16, a front panel 18 is placed onto the housing. On the side facing away from the air duct, the front panel comprises an outflow grating 20 and a manual actuating element 22 passing through the outflow grating 20. The outflow grating 20 here as visual protection conceals air-guiding elements which are located therebehind and can be seen in FIG. 2.

Figure 2:
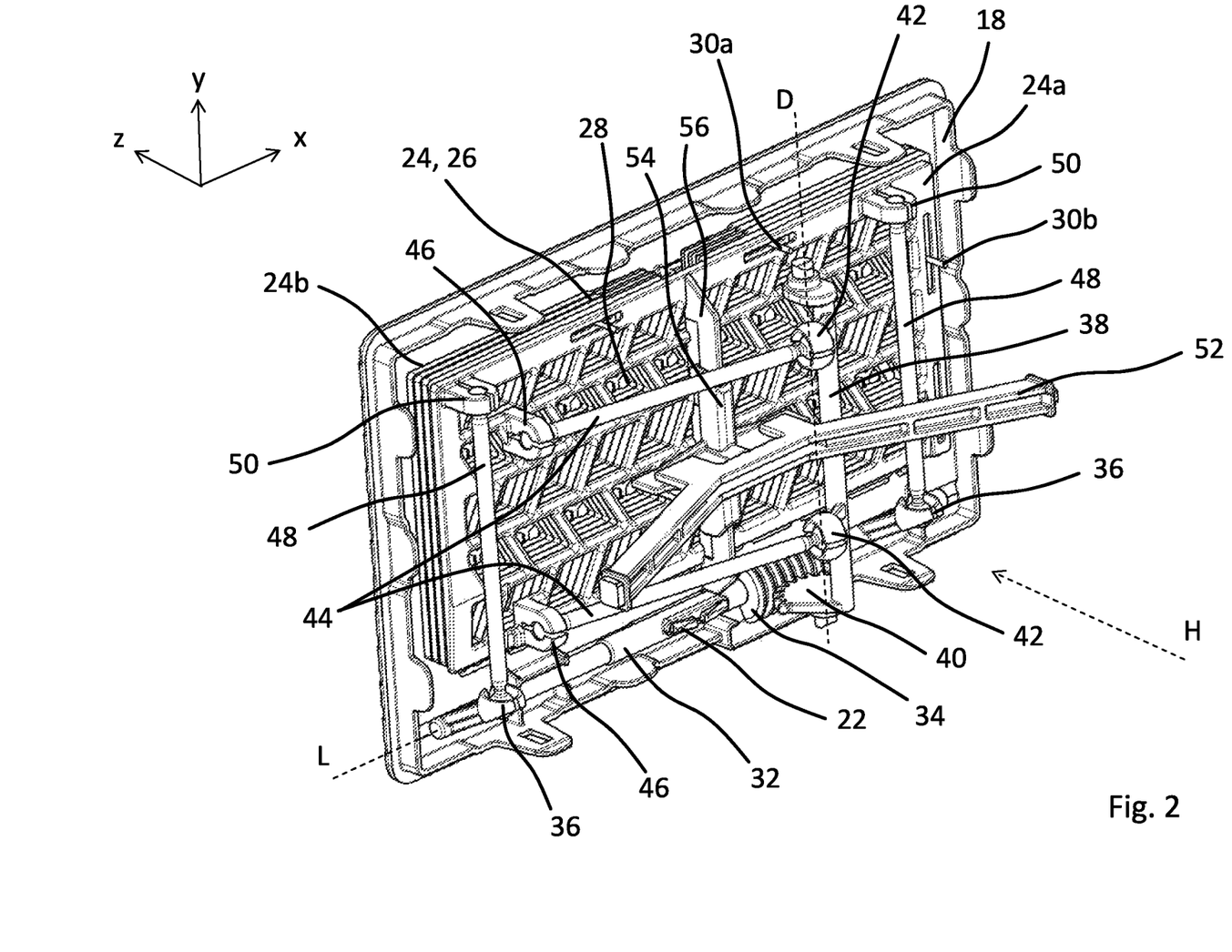
FIG. 2 shows the front panel of the air vent from FIG. 1 in a rear view.

In this refinement, the air-guiding elements are designed as air-guiding gratings 24 which form a common grating pack 26. The air-guiding gratings 24 each have a multiplicity of grating openings 28 which, in superimposition with air-guiding gratings adjacent to the grating openings, form a multiplicity of small air-conducting ducts. The outer air-guiding grating 24b is immovably connected to the front panel 18, while the further air-guiding gratings 24 are connected to the outer air-guiding grating 24b so as to be displaceable relative to each other via two handles 30a and 30b. Orientation of the airflow takes place via displacement of the driven air-guiding grating 24a located furthest on the inside.

For this purpose, the manual actuating element 22 is connected via a clip connection to an operating shaft 32 which extends perpendicularly to a main flow direction H along the X axis through the air duct. The main flow direction H denotes the flow direction of an unobstructed airflow, i.e. an airflow which is not deflected by air-guiding elements, from the air inlet end 14 to the air outlet end 16. The operating shaft 32 has a toothing 34 with teeth extending perpendicularly to the longitudinal axis L of the operating shaft 32, and two ball and socket joints 36 arranged at opposite ends of the operating shaft 32. The operating shaft 32 is in engagement with a gearwheel 40 of a rotary shaft 38 via the toothing 34. The rotary shaft 38 is mounted at its opposite ends on the housing 12 and is rotatable about its axis of rotation D. The rotary shaft 38 is connected in turn via two ball and socket joints 42, which are arranged offset with respect to the axis of rotation D, to two push rods 44. The push rods 44 are each mounted on the inner air-guiding grating 24a via a further ball and socket joint 46. In addition, the operating shaft 32 is connected via its ball and socket joints 36 to two push rods 48 which are mounted in turn on the inner air-guiding grating 24a via ball and socket joints 50. Furthermore, FIG. 2 shows a first guide element 52 which is mounted on the housing 12 via two opposite arms and in which a second guide element 54 of cross-shaped design is accommodated. The second guide element 54 is mounted movably along the X axis in relation to the first guide element 52. In addition, a slide 56 of the inner air-guiding grating 24a is mounted movably along the Y axis in a guide of the second guide element 54. The air-guiding gratings 24 are pressed onto the front panel 18 via the first guide element 52, which can prevent an undesirable adjustment of the air-guiding gratings. However, this is optional.

A sufficient pressure on the air-guiding gratings can also already be applied by the rotary shaft 38 and the push rods 44. In particular for this purpose, a second push rod is expedient.

According to the invention, the manual actuating element 22 is movable in a translational manner along a movement axis and in a rotational manner about said movement axis. The movement axis extends here along the longitudinal axis L of the operating shaft 32 since the manual actuating element 22 is directly coupled thereto. A translational movement of the manual actuating element to the right along the X axis in FIG. 2 leads by engagement of the toothing 34 with the gearwheel 40 to a rotational movement of the rotary shaft 38 to the right. On account of the arrangement of the ball and socket joints 42 in an offset manner with respect to the axis of rotation D, said ball and socket joints are moved along a partial circle about the axis of rotation D during rotation of the rotary shaft 38. In the explained situation, the push rods 44 are pushed along via the ball and socket joints 42 by the rotary shaft 38 in the opposite direction on the X axis, as a result of which, because of the coupling of the push rod 44 to the inner air-guiding grating 24a via the ball and socket joints 46, a movement of the inner air-guiding grating 24a on the X axis takes place in a direction opposed to the direction of movement of the operating shaft 32. Via the handle 30b, said movement to the left on the X axis is transferred from the inner air-guiding grating 24 to the further air-guiding gratings 24 which are therefore deflected in the same direction—but to a decreasing extent as the distance from the inner air-guiding grating 24a increases. By this means, the air-conducting ducts formed by the grating openings 28 are displaced in such a manner that the air outlet direction of the airflow is changed to the right along the X axis. If the manual actuating element 22 is displaced in the opposed direction, i.e. to the left, along the X axis, the rotary shaft 48 likewise rotates in the opposed direction and, via the push rod 44, pulls the inner air-guiding grating 24a to the right along the X axis, which results in an orientation of the emerging airflow to the left on the X axis. The use of two push rods acting in a manner offset along the axis of rotation of the rotary shaft and in an offset manner on the air-guiding grating 24a ensures here that shearing forces which may result in a deflection of the air-guiding gratings in an undesirable direction are minimized. Consequently, with the explained mechanism, a translational movement of the manual actuating element can be converted into a correspondingly changed direction of the emerging airflow. If an operator therefore moves the actuating element to the left, the airflow is also deflected to the left. A corresponding situation applies during a movement to the right. The second guide element 54 slides here in the guide of the first guide element 52.

During a tilting movement of the manual actuating element 22 about the movement axis, i.e. about the longitudinal axis L of the operating shaft 32, the teeth of the gearwheel 40 slide along in the toothing 34. Consequently, such a tilting movement of the manual actuating element does not have an effect on an orientation of the air-guiding elements along the X axis. Instead, by means of a tilting movement of the actuating element 22 upward along the Y axis, a rotation of the operating shaft 32 about its longitudinal axis L, which runs along the X axis, takes place in such a manner that the push rods 48 are pulled downward along the Y axis via the ball and socket joints 36. For this purpose, the ball and socket joints 36 are likewise arranged offset with respect to the longitudinal axis L and describe a partial circle during the rotation of the operating shaft 32. Via the coupling by means of the ball and socket joints 50, the push rods 48 pull the inner air-guiding grating 24a downward along the Y axis. The further air-guiding gratings 24 are moved in the same direction to a correspondingly graduated extent—via the handle 30A. The air-conducting ducts formed by the grating openings 28 are therefore oriented pointing upward in such a manner that a deflection of the airflow from the main flow direction H takes place upward along the Y axis. If the manual actuating element 22 is tilted downward along the Y axis, the operating shaft 32 rotates in the opposed direction and displaces the push rods 48 upward along the Y axis. By this means, the air-guiding gratings 24 are likewise displaced upward to a graduated extent and the airflow is consequently deflected downward along the Y axis from the main flow direction H. Via this mechanism, the tilting movement of the manual actuating element 22 is converted into a translational movement of the air-guiding gratings 24, which leads to a change in the air outlet direction in the direction of movement. In this case, the slide 56 slides within the guide of the second guide element 54.

The manual actuating element 22 and the operating shaft 32 are arranged here completely outside the airflow and therefore do not negatively impair the latter. Although the operating shaft 32 is located within the air duct, the airflow passes beyond said operating shaft. In addition, the rotary shaft 38 is also arranged at least in sections, namely at its lower end surrounding the gearwheel 40, outside the airflow. The push rods 48 are each in engagement at one end with opposite end portions of the operating shaft 32. In addition, the push rods 48 are each in engagement at their other end with corner regions of the inner air-guiding grating. By this means, during the movement of the operating shaft 32 along its longitudinal axis L, the push rods 48 only enter slightly into the airflow since only a slight tilting of the push rods in relation to the Y axis takes place. Said push rods therefore also scarcely disturb the airflow.

The explained embodiment of the invention therefore permits the particularly intuitive movement according to the invention of an actuating element with simultaneously optimum conducting of air with only an extremely small negative influencing of the airflow for air vents with air-guiding gratings as air-guiding elements.

FIGS. 3 to 6 show a second exemplary embodiment of the invention which, instead of air-guiding gratings, has slats as air-guiding elements. As is apparent in FIG. 3, said air vent 10' also has a housing 12' which bounds an air duct extending from an air inlet end 14' to an air outlet end 16', a front panel 18' and a manual actuating element 22 which is movable in accordance with the invention. Furthermore, an operating wheel 58 is illustrated which serves for moving a shut-off flap for restricting or for completely interrupting the airflow. Such an operating wheel with a shut-off flap can in principle also be provided in the abovementioned exemplary embodiment. A plurality of inner slats 60 and a plurality of outer slats 62 are provided as air-guiding elements. The slats 60 extend along the Y axis parallel to one another and serve for deflecting the airflow along the X axis to the left and right from the main flow direction H—which runs along the Z axis. The slats 62 extend along the X axis parallel to one another and serve for deflecting the airflow upward and downward from the main flow direction H on the Y axis.

Figure 3:
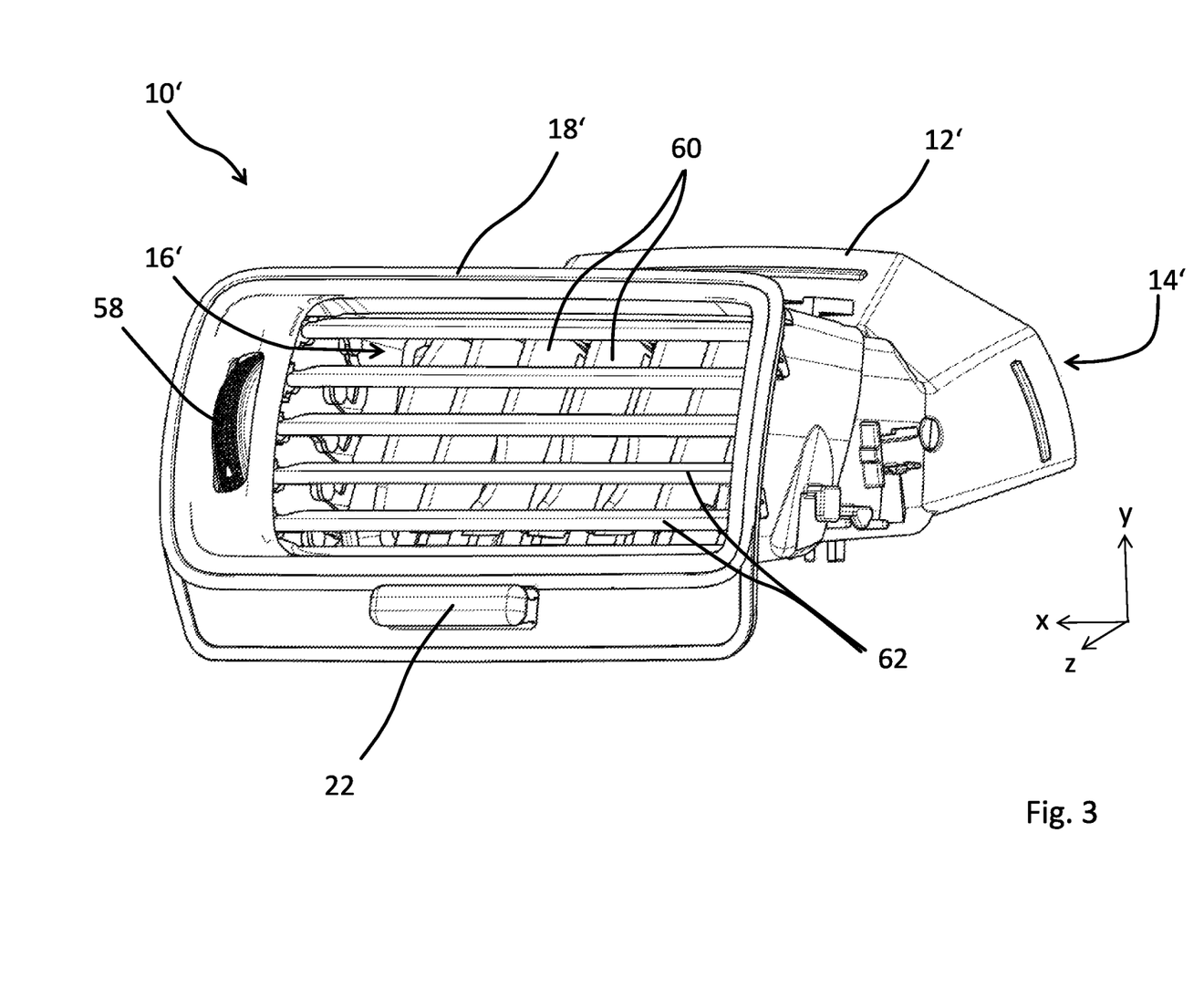
FIG. 3 shows an air vent according to the invention in a second refinement with slats as air-guiding elements.
Figure 4:
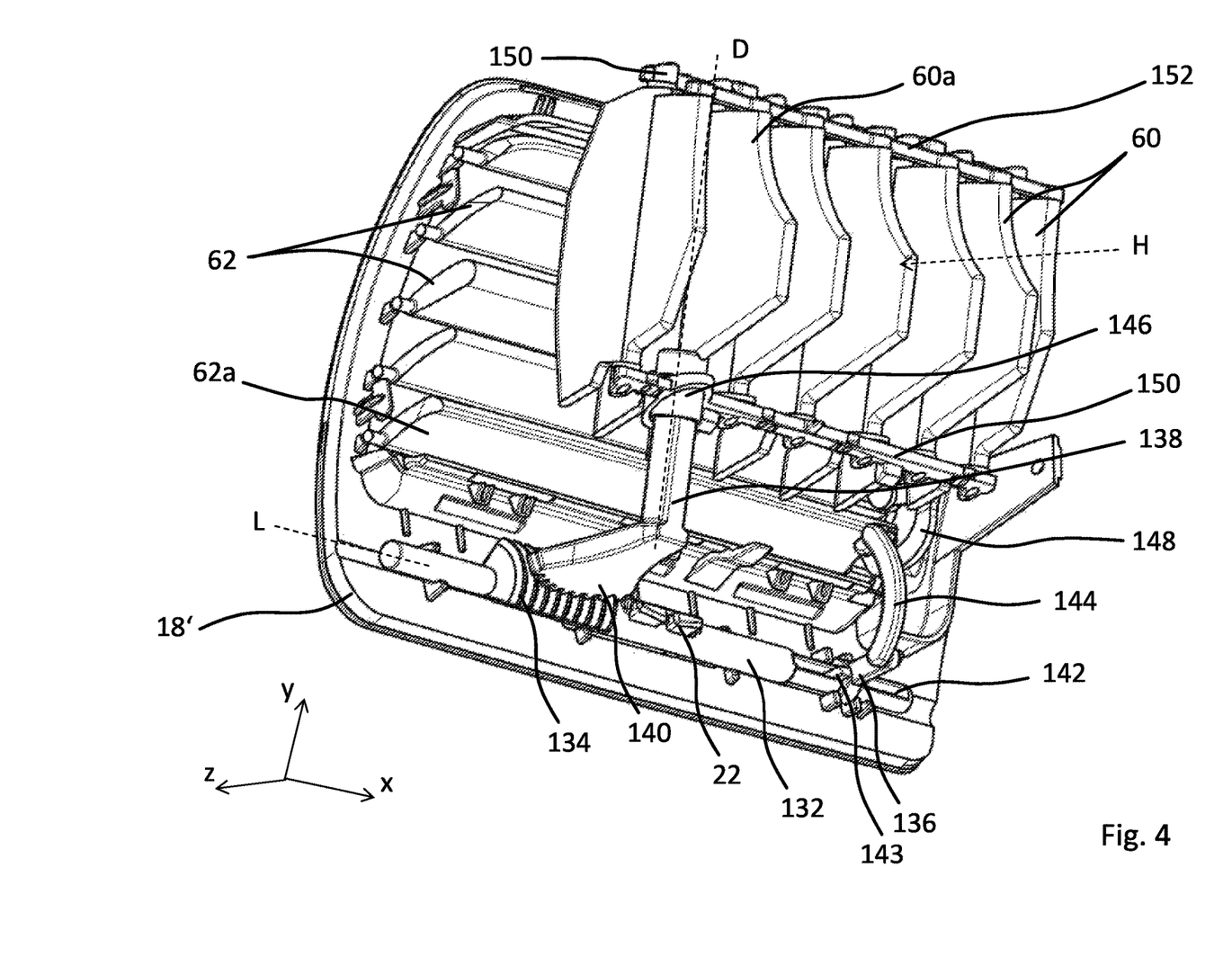
FIG. 4 shows the front panel of the air vent from FIG. 3 together with slats in a rear view.

FIG. 4 shows the front panel 18' from FIG. 3 in a rear view looking at the slats 60, 62 and at the mechanism driving the slats. Also in this exemplary embodiment, the manual actuating element 22 is directly connected to an operating shaft 132 via a clip connection. The operating shaft 132 in turn has a toothing 134 via which there is an engagement in a gearwheel 140 of a rotary shaft 138, which is perpendicular to the operating shaft 132. The rotary shaft 138 is coupled in terms of movement to a slat 60a of the inner slats 60 via a connecting element 146. The slats 60 are mounted on the housing 12 via bearing strips 150 and are coupled in terms of movement to one another via a coupling rod 152. In addition, the operating shaft 132 has a coupling lever 136 which acts on a slat 62a of the horizontal slats 62 via a coupling rod 144.

If the manual actuating element 22 moves in a translational manner along the movement axis, which also coincides here with the longitudinal axis L, which runs on the X axis, of the operating shaft 32, a translational movement of the operating shaft 132 in the same direction takes place. During a movement of the operating shaft 132 to the right on the X axis, the rotary shaft 138 is rotated around to the right because of the engagement of the toothing 134 in the teeth of the gearwheel 140. On account of the coupling of the rotary shaft 138 to the slat 60a, said slat is correspondingly pivoted together with the further slats 60, which leads to a deflection of the airflow to the right along the X axis. A translational movement of the manual actuating element 22 and therefore of the operating shaft 132 to the left along the X axis in FIG. 4 correspondingly leads to an opposed rotation of the rotary shaft 138 and consequently to an adjustment of the slats 60 and therefore of the air outlet direction to the left along the X axis.

By means of a tilting movement of the manual actuating element 22 about the longitudinal axis L, the operating shaft 132 is rotated about its longitudinal axis L, with the teeth of the gearwheel 140 sliding along in the toothing 134. Also in this refinement, a tilting movement about the movement axis consequently does not result in any change of the air outlet direction along the movement axis. Instead, such a tilting movement via the rotation of the operating shaft 132 leads to a corresponding rotation of the coupling lever 136 about the longitudinal axis L. If the manual actuating element 22 is moved, for example, upward along the Y axis in FIG. 4, because of the rotation of the operating shaft 132 the coupling lever 136 moves downward and pulls the coupling rod 144 along with it. Via the coupling rod 144, the slat 62a in turn is pivoted about its bearing axis. On account of a coupling clip 148, the further slats 62 move in a corresponding manner, which finally leads to a deflection of the airflow upward and therefore in the direction of movement of the manual actuating element. During a movement of the manual actuating element 22 downward along the Y axis, the operating shaft 132 consequently rotates in an opposed manner, as a result of which the coupling lever 136 pushes the coupling rod 144 upward along the Y axis and therefore, via the slat 62a, all of the slats 62 are pivoted in such a manner that the airflow is deflected downward along the Y axis.

This refinement therefore also results in a movement, which is intuitive in accordance with the invention, of the manual actuating element with the latter simultaneously being arranged outside the airflow. As is apparent in FIG. 6, the operating shaft 132 and the coupling lever 136 are also not only located here outside the airflow, but even outside the air duct, i.e. the housing 12'. Said elements therefore cannot undesirably adversely affect the airflow. The rotary shaft 138 is also arranged here at least in sections, i.e. with its gearwheel 140, outside the air duct. The coupling rod 144 also partly projects out of the housing and accordingly only slightly disturbs the airflow.

Figure 5:
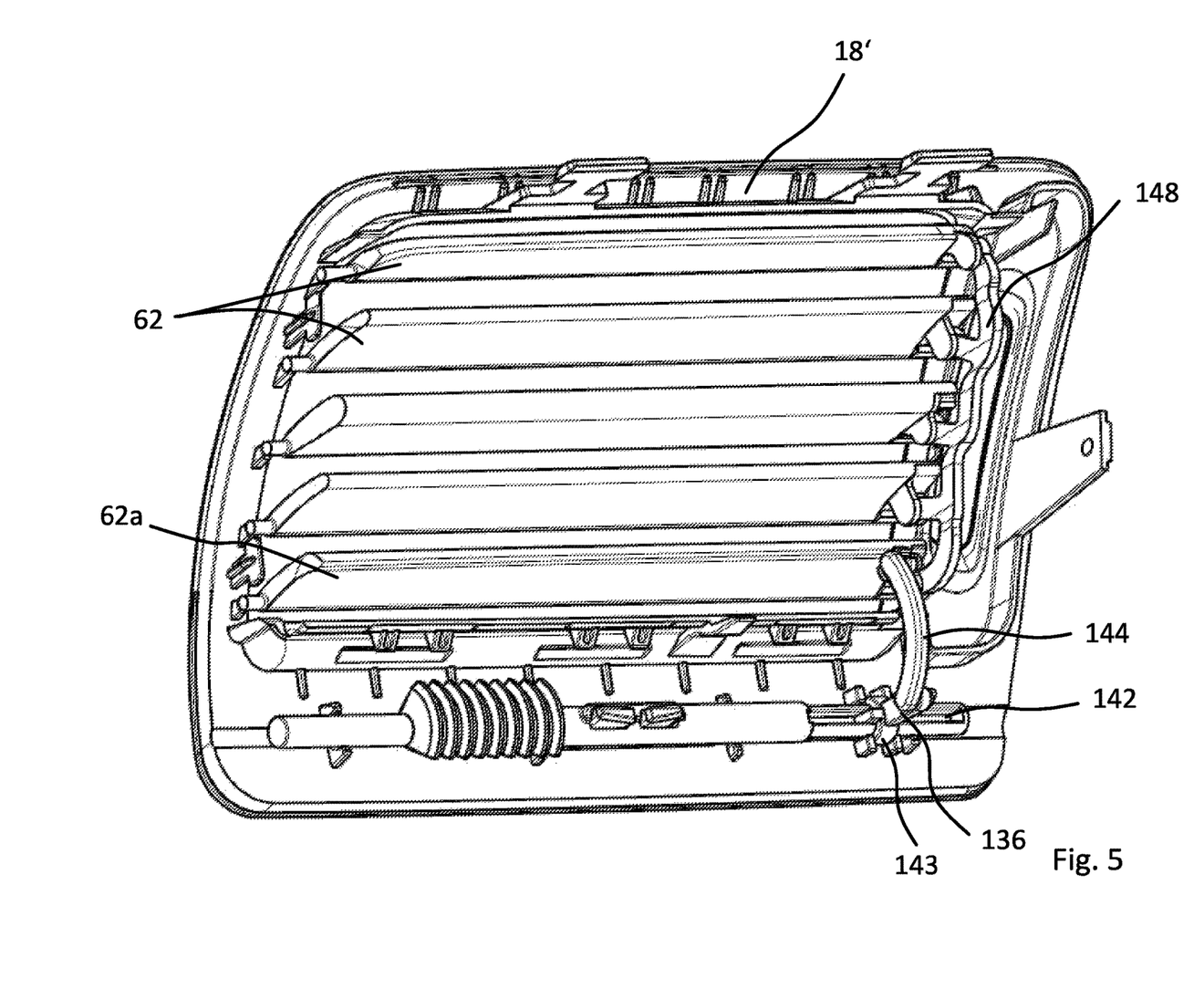
FIG. 5 shows the front panel from FIG. 4 without the rear slats.
Figure 6:
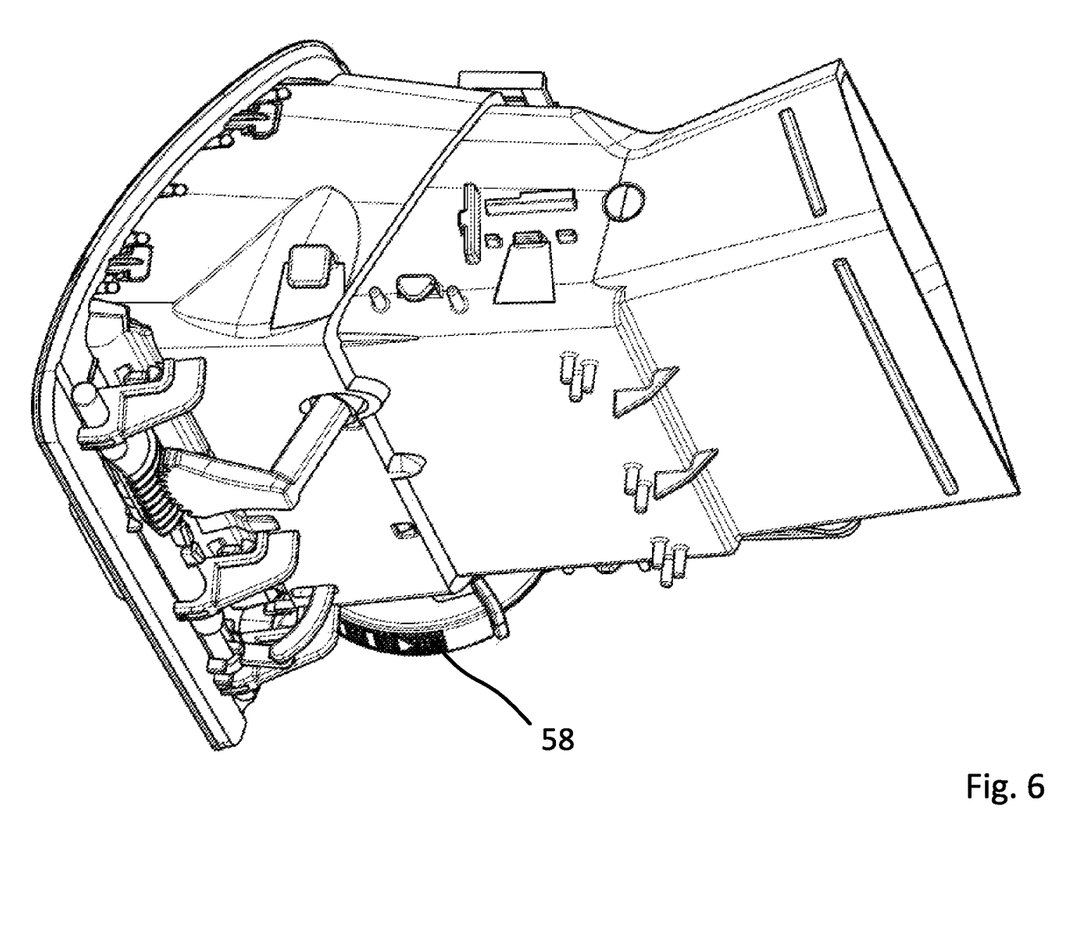
FIG. 6 shows the air vent from FIG. 3 in a view from below.

In addition, it is apparent in FIG. 4 and in FIG. 5 that the operating shaft 132 is coupled to the coupling rod 144 via a tongue and groove connection. During a movement of the operating shaft 132 along its longitudinal axis L, a spring 143 of the coupling lever 136 slides in a groove 142 of the operating shaft 132, and therefore a translational movement of the manual actuating element 22 and therefore of the operating shaft 132 does not have any influence on the setting of the horizontal slats 62 and therefore on a deflection of the airflow along the Y axis.

LIST OF REFERENCE SIGNS 10, 10' Air vent
12, 12' Housing
14, 14' Air inlet end
16, 16' Air outlet end
18, 18' Front panel
20 Outflow grating
22 Manual actuating element
24 Air-guiding grating
24a Inner air-guiding grating
24b Outer air-guiding grating
26 Grating pack
28 Grating openings
30a, 30b Handle
32 Operating shaft
34 Toothing
36 Ball and socket joints
38 Rotary shaft
40 Gearwheel
42 Ball and socket joints
44 Push rods
46 Ball and socket joints
48 Push rods
50 Ball and socket joints
52 First guide element
54 Second guide element
56 Slide
58 Operating wheel
60 Inner slats
60a Driven slat
62 Outer slats
62a Driven slat
132 Operating shaft
134 Toothing
136 Coupling lever
138 Rotary shaft
140 Gearwheel
142 Groove
143 Spring
144 Coupling rod
146 Connecting element
148 Coupling clip
150 Bearing strips
152 Coupling rod

The invention claimed is:

1. An air vent for a vehicle, comprising:
an air duct, which is bounded by a housing, with an air inlet end and an air outlet end, wherein an air flow flowing through the air duct can flow from the air inlet end to the air outlet end along a main flow direction;
a manual actuating element for controlling the air outlet direction of the air flow, wherein, during a translational movement of the manual actuating element along a movement axis the air outlet direction undergoes a change along said movement axis, and wherein, during a tilting movement of the manual actuating element about the movement axis, the air outlet direction undergoes a change perpendicular to the movement axis, wherein the manual actuating element is arranged outside the air flow;

at least one air-guiding element on which the manual actuating element acts in order to control the air outlet direction;

wherein a movement of the manual actuating element is transferred to the at least one air-guiding element by an operating shaft which is arranged outside the air flow and extends parallel to the movement axis, wherein a movement of the manual actuating element in one direction results in a movement of the operating shaft in the same direction;

wherein a rotary shaft is connected to the at least one air-guiding element and runs perpendicularly to the operating shaft, wherein the rotary shaft has a gearwheel which is outside the air flow and in engagement with a toothing of the operating shaft in such a manner that, during a translational movement of the operating shaft along its longitudinal axis, the rotary shaft is rotated about its axis of rotation;

wherein, as air-guiding elements, a plurality of air-guiding gratings which extend substantially perpendicularly to the main flow direction and are coupled to one another in terms of movement are arranged in the air duct, wherein the rotary shaft is connected via at least one push rod to a driven air-guiding grating in such a manner that, by means of a rotational movement of the rotary shaft, the driven air-guiding grating is adjusted in a translatory manner counter to the direction of movement of the operating shaft.

2. The air vent as claimed in claim 1, wherein, during a translational movement of the manual actuating element along the movement axis in a first direction, the emerging air flow undergoes a change in the first direction, and in that, during a translational movement of the manual actuating element along the movement axis in a second direction opposed to the first direction, the emerging air flow undergoes a change in the second direction.

3. The air vent as claimed in claim 1, wherein, during a tilting movement of the manual actuating element in a first direction, the emerging air flow undergoes a change in the first direction perpendicular to the movement axis, and wherein, during a tilting movement of the manual actuating element in a second direction opposed to the first direction, the emerging air flow undergoes a change in the second direction perpendicular to the movement axis.

4. The air vent as claimed in claim 1, wherein the rotary shaft is connected via at least two push rods, which are arranged offset along the axis of rotation of said rotary shaft, to the driven air-guiding grating.

5. The air vent as claimed in claim 1, wherein the operating shaft is connected via at least one push rod to the driven air-guiding grating in such a manner that, during a tilting movement of the operating shaft about the movement axis, the driven air-guiding grating is adjusted in a translatory manner perpendicular to the operating shaft.

6. The air vent as claimed in claim 5, wherein the operating shaft is connected via at least two push rods, which arranged offset along the longitudinal axis of said operating shaft, to the driven air-guiding grating.

7. An air vent for a vehicle, comprising:

an air duct, which is bounded by a housing, with an air inlet end and an air outlet end, wherein an air flow flowing through the air duct can flow from the air inlet end to the air outlet end along a main flow direction;

a manual actuating element for controlling the air outlet direction of the air flow, wherein, during a translational movement of the manual actuating element along a movement axis the air outlet direction undergoes a change along said movement axis, and wherein, during a tilting movement of the manual actuating element about the movement axis, the air outlet direction undergoes a change perpendicular to the movement axis, wherein the manual actuating element is arranged outside the air flow;

at least one air-guiding element on which the manual actuating element acts in order to control the air outlet direction;

wherein a movement of the manual actuating element is transferred to the at least one air-guiding element by an operating shaft which is arranged outside the air flow and extends parallel to the movement axis, wherein a movement of the manual actuating element in one direction results in a movement of the operating shaft in the same direction;

wherein a rotary shaft is connected to the at least one air-guiding element and runs perpendicularly to the operating shaft, wherein the rotary shaft has a gearwheel which is outside the air flow and in engagement with a toothing of the operating shaft in such a manner that, during a translational movement of the operating shaft along its longitudinal axis, the rotary shaft is rotated about its axis of rotation;

wherein, as air-guiding elements, a plurality of slats which extend parallel to the rotary shaft, are pivotable in relation to the main flow direction and are coupled in terms of movement to each other are arranged in the air duct, wherein the rotary shaft is connected to one of the slats in such a manner that a rotational movement of the rotary shaft is converted into a corresponding rotational movement of the slats;

wherein, as further air-guiding elements, a plurality of slats which extend parallel to the operating shaft, are pivotable in relation to the main flow direction and are coupled in terms of movement to each other are arranged in the air duct, wherein the operating shaft is coupled to at least one of said slats via at least one coupling rod in such a manner that, during a tilting movement of the operating shaft about its longitudinal axis, the slats are correspondingly pivoted in the direction of rotation of the operating shaft.

8. The air vent as claimed in claim 7, wherein the operating shaft is coupled to the coupling rod via an interlocking connection, in particular a tongue and groove connection, in such a manner that a translatory movement of the operating shaft along its longitudinal axis is not transferred to the coupling rod.

9. A vehicle with an air vent as claimed in claim 1.

* * * * *